United States Patent
Murthy et al.

(10) Patent No.: US 12,007,985 B2
(45) Date of Patent: Jun. 11, 2024

(54) EXECUTING TRANSACTIONS ON DISTRIBUTED DATABASES

(71) Applicant: Couchbase, Inc., Santa Clara, CA (US)

(72) Inventors: Raghupathi Keshava Murthy, Union City, CA (US); Sitaram Vemulapalli, San Jose, CA (US); Kamini Manoharlal Jagtiani, Los Altos, CA (US)

(73) Assignee: Couchbase, Inc., Santa Clara, CA (US)

( * ) Notice: Subject to any disclaimer, the term of this patent is extended or adjusted under 35 U.S.C. 154(b) by 0 days.

(21) Appl. No.: 18/144,057

(22) Filed: May 5, 2023

(65) Prior Publication Data

US 2023/0315718 A1 Oct. 5, 2023

Related U.S. Application Data

(63) Continuation of application No. 17/007,561, filed on Aug. 31, 2020, now Pat. No. 11,681,687.

(51) Int. Cl.
*G06F 16/23* (2019.01)
*G06F 16/245* (2019.01)
*G06F 16/27* (2019.01)

(52) U.S. Cl.
CPC ........ *G06F 16/2379* (2019.01); *G06F 16/245* (2019.01); *G06F 16/27* (2019.01);
(Continued)

(58) Field of Classification Search
CPC .... G06F 16/2379; G06F 16/27; G06F 16/273; G06F 16/245; G06F 16/275; G06F 16/278
See application file for complete search history.

(56) References Cited

U.S. PATENT DOCUMENTS 6,314,417 B1 * 11/2001 Bennett .................. G06F 16/10
707/703
6,397,228 B1 5/2002 Lamburt et al.
(Continued)

FOREIGN PATENT DOCUMENTS

EP 3182300 A1 6/2017
WO WO 2020/113314 A1 6/2020

OTHER PUBLICATIONS

U.S. Office Action, U.S. Appl. No. 17/327,397, filed Nov. 7, 2023, 44 pages.
(Continued)

*Primary Examiner* — Kris E Mackes
*Assistant Examiner* — Lin Lin M Htay
(74) *Attorney, Agent, or Firm* — Fenwick & West LLP

(57) ABSTRACT

A distributed database system receives and executes a transaction including a first modification statement describing a first modification operation on a subset of records, a second modification statement describing a second modification operation on the subset of records, and a commit statement. Responsive to executing the first and second modification statements, the system receives a copy of the subset of records from data servers; performs the first modification operation to generate a first modified subset of records; and performs the second modification operation on the first modified subset of records. Responsive to executing the commit statement, the system stores the second modified subset of records in a commit table and causes the subset of records to be updated at the data servers.

20 Claims, 7 Drawing Sheets

(52) U.S. Cl.
CPC .......... *G06F 16/273* (2019.01); *G06F 16/275* (2019.01); *G06F 16/278* (2019.01)

(56) References Cited

U.S. PATENT DOCUMENTS

| | | | |
|---|---|---|---|
| 7,689,565 | B1 | 3/2010 | Gandhi et al. |
| 9,760,571 | B1 | 9/2017 | Ben-Natan et al. |
| 10,489,356 | B1 | 11/2019 | Shah et al. |
| 10,983,981 | B1 | 4/2021 | Sharma et al. |
| 11,144,275 | B1 | 10/2021 | Hinckley et al. |
| 11,294,896 | B2 | 4/2022 | Miao et al. |
| 11,397,750 | B1 | 7/2022 | Lekakis et al. |
| 2005/0190949 | A1 | 9/2005 | Weber |
| 2007/0239661 | A1 | 10/2007 | Cattell et al. |
| 2008/0120304 | A1 | 5/2008 | Calio et al. |
| 2010/0138407 | A1 | 6/2010 | Fraser et al. |
| 2010/0180257 | A1 | 7/2010 | Dern |
| 2012/0102377 | A1 | 4/2012 | Viswanathan et al. |
| 2012/0124563 | A1 | 5/2012 | Chung et al. |
| 2013/0006950 | A1 | 1/2013 | Adayilamuriyil et al. |
| 2013/0339960 | A1 | 12/2013 | Greiner et al. |
| 2014/0379693 | A1 | 12/2014 | May et al. |
| 2016/0055261 | A1 | 2/2016 | Reinhardt et al. |
| 2016/0110403 | A1* | 4/2016 | Lomet ................. G06F 16/2255 707/695 |
| 2016/0378820 | A1 | 12/2016 | Marcotte |
| 2017/0031990 | A1 | 2/2017 | Chakkappen et al. |
| 2017/0161352 | A1 | 6/2017 | Horii |
| 2017/0177697 | A1 | 6/2017 | Lee et al. |
| 2018/0095968 | A1 | 4/2018 | Seki |
| 2018/0121492 | A1 | 5/2018 | Sawhney |
| 2018/0165343 | A1 | 6/2018 | Fan et al. |
| 2018/0253452 | A1 | 9/2018 | Callan et al. |
| 2018/0349458 | A1 | 12/2018 | Guirguis et al. |
| 2019/0138743 | A1 | 5/2019 | Nerurkar et al. |
| 2020/0160289 | A1 | 5/2020 | Mahajan et al. |
| 2020/0327545 | A1 | 10/2020 | Xie |
| 2020/0379999 | A1 | 12/2020 | Xia et al. |
| 2020/0387496 | A1 | 12/2020 | Holmes et al. |
| 2021/0240498 | A1 | 8/2021 | Padmanabhan et al. |
| 2022/0019575 | A1 | 1/2022 | Qian |

OTHER PUBLICATIONS

Gordo, A. et al., "Large-Scale Document Image Retrieval and Classification with Run-Length Histograms and Binary Embeddings," Pattern Recognition, vol. 46, Dec. 19, 2012, pp. 1989-1905.

Gottschlich, J.E. et al., "An Efficient Software Transactional Memory Using Commit-Time Invalidation," Code Generation and Optimization, Apr. 2010, pp. 101-110.

Mayuram, R., "Couchbase Brings Multi-Document ACID Transactions to JSON Database," Aug. 9, 2019, pp. 1-10, [Online] [Retrieved on Jun. 8, 2021] Retrieved from the Internet <URL: https://blog.couchbase.com/couchbase-brings-multi-document-acid-transaction-to-json-database/>.

PCT International Search Report and Written Opinion, PCT Application No. PCT/IB2021/057413, dated Nov. 9, 2021, 12 pages.

PCT International Search Report and Written Opinion, PCT Application No. PCT/US2021/033795, dated Aug. 17, 2021, 17 pages.

U.S. Office Action, U.S. Appl. No. 17/327,397, filed Aug. 17, 2022, 28 pages.

U.S. Office Action, U.S. Appl. No. 17/327,455, filed Nov. 10, 2022, 31 pages.

U.S. Office Action, U.S. Appl. No. 17/711,982, filed Dec. 22, 2022, 8 pages.

U.S. Office Action, U.S. Appl. No. 17/007,561, filed Oct. 3, 2022, 17 pages.

U.S. Office Action, U.S. Appl. No. 17/007,561, filed Apr. 1, 2022, 17 pages.

"redis-transactions," HEXH's Blog, Jul. 3, 2015, 11 pages, Retrieved from the internet <URL:http://dangxia.github.io/2015/07/03/redis/redis-transactions/.

U.S. Office Action, U.S. Appl. No. 17/327,455, filed Jun. 2, 2023, 25 pages.

U.S. Office Action, U.S. Appl. No. 17/327,397, filed Mar. 3, 2023, 31 pages.

* cited by examiner

Statement 410 Delta Table Entries 430

| CAS Value | Record ID | a  | b | c   |
|-----------|-----------|----|---|-----|
| 100       | k1        | 11 | 6 | xy  |
| 831       | k2        | 21 | 8 | bc  |
| 231       | k3        | 36 | 7 | cde |

Statement 410 Transaction Log Entries 435

| Modification |
|--------------|
| 10 to 11     |
| 20 to 21     |
| 35 to 36     |

Statement 415 Delta Table Entries 440

| CAS Value | Record ID | a    | b  | c   |
|-----------|-----------|------|----|-----|
| 100       | k1        | 26   | 6  | xy  |
| 831       | k2        | 36   | 8  | bc  |
| 231       | k3        | 51   | 7  | cde |
| 472       | k12       | 5478 | 14 | def |

Statement 415 Transaction Log Entries 445

| Modification  |
|---------------|
| 11 to 26      |
| 21 to 36      |
| 36 to 51      |
| 5463 to 5478  |

Statement 420 Projection Table 450

| Record ID | a    | b  | c   |
|-----------|------|----|-----|
| k1        | 26   | 6  | xy  |
| k2        | 36   | 8  | bc  |
| k3        | 51   | 7  | cde |
| k5        | 57   | 17 | pqr |
| k12       | 5478 | 14 | def |

Statement 420 Transaction Log Entries 455

| Modification |
|--------------|

Commit Table 460

| CAS Value | Record ID | a    | b  | c   |
|-----------|-----------|------|----|-----|
| 100       | k1        | 26   | 6  | xy  |
| 831       | k2        | 36   | 8  | bc  |
| 231       | k3        | 51   | 7  | cde |
| 472       | k12       | 5478 | 14 | def |

*FIG. 4B*

EXECUTING TRANSACTIONS ON DISTRIBUTED DATABASES

CROSS-REFERENCE TO RELATED APPLICATIONS

This application is a continuation of U.S. patent application Ser. No. 17/007,561, filed Aug. 31, 2020, which is hereby incorporated by reference in its entirety.

BACKGROUND

Field of Art

This disclosure relates in general to distributed databases, and in particular to executing transactions in distributed databases.

Description of the Related Art

Enterprises store data in various types of data stores such as relational databases, object-oriented databases, graph databases, document-oriented databases and so on. A large amount of data is stored in non-distributed database (e.g., centralized databases), such as traditional Structured Query Language (SQL) databases. Some database management systems (DBMSs) for such non-distributed databases represent transactions using a declarative query language (e.g., SQL), and maintain the "ACID" properties for transactions (i.e., atomicity, consistency, isolation, and durability).

However, there is an increase in using distributed databases to store data. An example of such distributed databases includes NoSQL databases, such as document-oriented databases, key-value stores, and graph databases. Due to the distributed nature of these databases, executing transactions which maintain the ACID properties and provide effective performance is challenging. Furthermore, NoSQL databases do not represent transactions using a declarative query language capable of representing transaction statements of arbitrary complexity, such as SQL.

SUMMARY

Embodiments of a disclosed system, method and computer readable storage medium execute transactions in a distributed database. A distributed database system receives transactions from a client device that can include statements describing arbitrarily complex modifications of records stored in the distributed database (e.g., documents), and may include a single statement (i.e., single statement transactions) or multiple statements (i.e., multi-statement transactions). Furthermore, the received transactions can be represented using a declarative query language or other query languages (e.g., procedural query languages). The distributed database system executes the transaction at a query server, where the execution includes obtaining copies of indexes and records corresponding to the statements of the transaction (e.g., by retrieving the indexes and records from the distributed database) and performing the modifications described by the one or more statements of the transaction on the record copies. The distributed database system stores modified record copies at the query server during execution of the transaction. Further, during execution of a statement of the transaction, if the statement is associated with a record copy stored at the query server during execution of a previous statement, the query server uses the stored record copies to execute the statement. By executing transactions at the query server, according to some embodiments, the distributed database system applies optimistic concurrency control for transactions by concurrently executing transactions at individual query servers without locking some or all of the processes of the distributed database system prior to performing a commit. After the transaction has successfully been executed at the query server, the distributed database system performs a commit process to update the records stored in the distributed database based on the modified record copies, such as committing the modified record copies to one or more data servers of the distributed database. In particular, the distributed database system performs a commit process which prevents conflicts with other transactions or other modifications of records executed by the distributed database system (e.g., a transaction executed concurrently).

A distributed database system receives a transaction including a statement including instructions for modification of a record stored at a data server of a distributed database. After receiving the transaction, the distributed transaction system executes the transaction at a query server. During execution of the transaction at the query server, the distributed database system obtains a copy of the record at the query server. Using the obtained record copy, the distributed database system performs the modification described by the statement on the record copy at the query server. The distributed database system stores the modified record copy at the e query server. After executing the received transaction at the query server, the distributed database system updates the record stored at the data server based on the modified record copy. In particular, the distributed database system updates the record without conflicting with any other transactions executed by the distributed database system.

In some embodiments, the distributed database system maintains one or more delta tables at the query server during execution of a transaction to store modified record copies. The query server can use the delta tables to execute statements (e.g., accessing the modified records), applying predicate logic in some statements of a transaction, or committing modified record copies to the distributed database.

In some embodiments, the distributed database system maintains transaction logs corresponding to statements of a transaction at the query server during execution of a transaction. The distributed database system can use the transaction logs to fully or partially rollback transactions which fail during execution at the query server.

BRIEF DESCRIPTION OF THE DRAWINGS

FIG. 4B illustrates internal data structures maintained by a query server during execution of the transaction depicted in FIG. 4A, according to an embodiment.

DETAILED DESCRIPTION

System Environment

Figure 1:
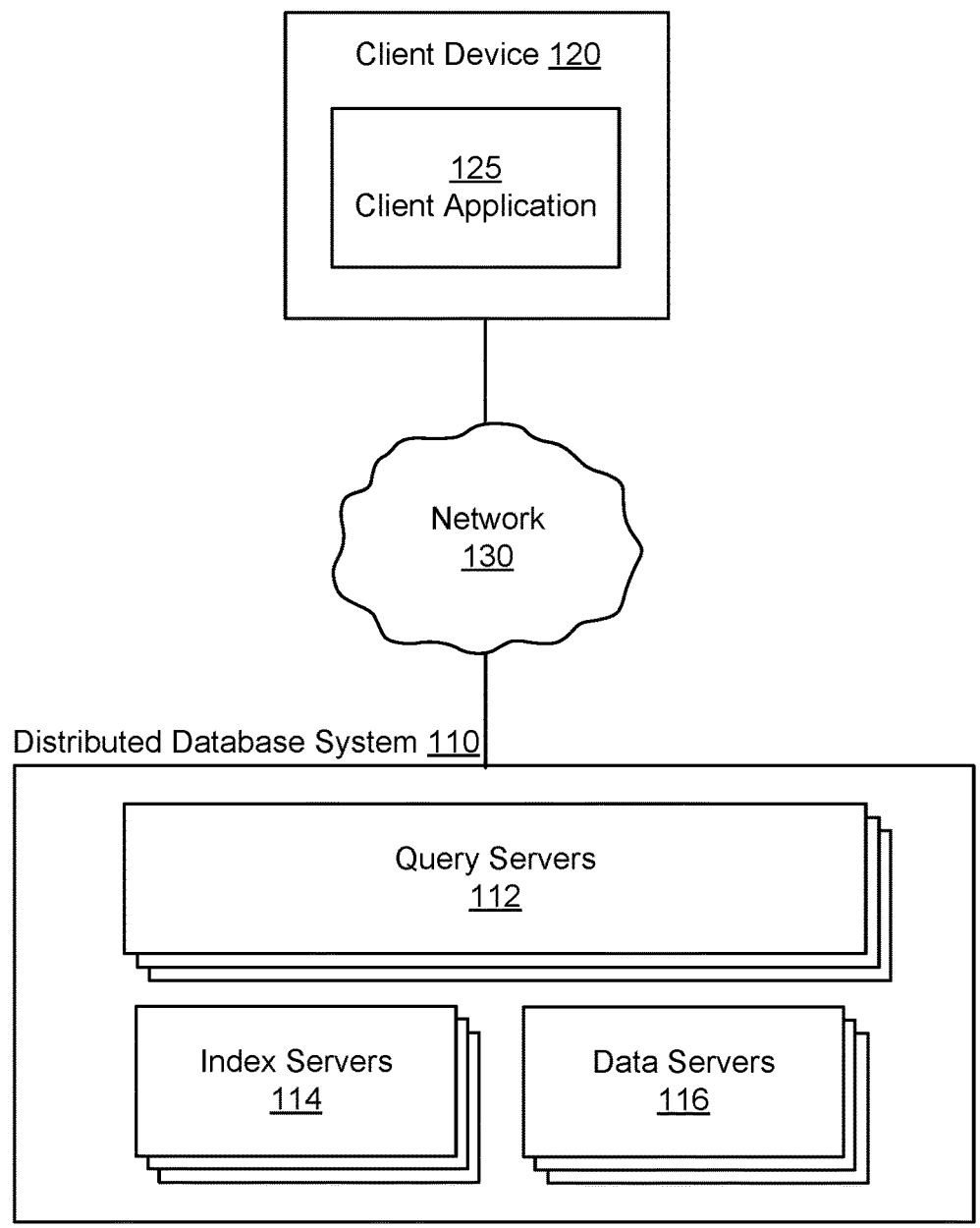
FIG. 1 is of a block diagram of a distributed database system environment for performing transactions, according to an embodiment.

FIG. 1 is an embodiment of a block diagram of a distributed database system environment 100 for performing transactions. In the embodiment shown, the system environment includes a distributed database system 110, a client device 120, and a network 130. Other embodiments may use more or fewer or different systems than those illustrated in FIG. 1. Functions of various modules and systems described herein can be implemented by other modules or systems than those described herein.

The distributed database system 110 manages a distributed database. The distributed database system 110 includes distributed query servers 112, distributed index servers 114, and distributed data servers 116 (e.g., database nodes). The distributed database system 110 receives transactions from the client device 120 that can include one or more statements (i.e., single or multi-statement transactions). In an exemplary embodiment, the statements of the received transactions are represented using a declarative query language, such as the Structured Query Language (SQL). A declarative query language refers to a query language which describes requests (e.g., transaction statements) in terms of what data to process and the desired results of the processing (e.g., what data to retrieve or what updates should be performed on data), but does not specify how the processing should be executed. Instead, a declarative query language relies on the underlying database system (e.g., the distributed database system 110) to determine how the requests should be executed. As such, declarative query languages allow for users (e.g., the client device 120) to submit arbitrarily complex requests, such as describing an arbitrary number of modifications to an arbitrary number of records or record fields. Example declarative query languages include structured query language (SQL), SQL++, Non-First Normal Form Query Language (N1QL), XML Query (XQuery), Cypher, SPARQL Protocol and RDF Query Language (SPARQL), and Gremlin. In other embodiments, the statements of received transactions can be represented using other types of query languages, such as procedural query languages. The distributed database system 110 executes received transactions using a query server of the distributed query servers 112 through a process which ensures the ACID properties of database transactions. In particular, according to some embodiments, the distributed database system 110 employs optimistic concurrency control for transactions by concurrently executing transactions at individual query servers 112 without locking some or all of the processes of the distributed database system 110 prior to performing a commit. Although FIG. 1 shows a single element, the distributed database system 110 broadly represents a distributed database including the distributed query servers 112, the index servers 114, and the data servers 116 which may be located in one or more physical locations. The individual elements of the distributed database system 110 (e.g., the query servers 112, the index servers 114, and the data servers 116) may be any computing device, including but not limited to: servers, racks, workstations, personal computers, general purpose computers, laptops, Internet appliances, wireless devices, wired devices, multi-processor systems, mini-computers, cloud computing systems, and the like. Furthermore, the elements of the distributed database system 110 depicted in FIG. 1 may also represent one or more virtual computing instances (e.g., virtual database nodes), which may execute using one or more computers in a datacenter such as a virtual server farm. In particular, the query servers 112, index servers 114, and data servers 116 may each be virtual database nodes executed on one or more computing devices.

In an exemplary embodiment, the statements of the received transactions describe manipulations of stored data (e.g., SQL data manipulation language (DML) statements, such as SELECT, INSERT, UPDATE, UPSERT, DELETE, and MERGE). DML statements can describe modifications of one or more records, such as INSERT, UPDATE, UPSERT, DELETE, and MERGE. In the same or different embodiment, the statements of the received transactions describe new data to store (e.g., SQL data definition language (DDL) statements), permissions of the distributed database system 110 (e.g., SQL data control language (DCL) statements), or configuring the processing of transactions by the distributed database system 110 (e.g., SQL transaction control language (TCL) statements). In various embodiments, the distributed database system may or may not permit transactions including certain types of statements (e.g., DDLs, DCLs, or TCLs).

The query servers 112 receive and process transactions in the distributed database system 110. The query server 112 may receive the transaction in the form of statements received from a client device, for example, database statements that include instructions such as update, insert, delete operations that modify records of the distributed database. In embodiments, a transaction received by the distributed database system 110 (e.g., from the client device 120) is routed to a particular query server 112 which is used to execute the transaction. For instance, the distributed database system 110 can select one of the query servers 112 to execute a received transaction (i.e., an execution query server), where the selected query server executes all of the statements included in the received transaction after execution begins. Each statement of a transaction may be assigned a transaction identifier of the transaction, and the distributed database system 110 may forward all statements with the transaction identifier to the same execution query server. A query server 112 maintains the ACID properties of transactions (atomicity, consistency, isolation, and durability) while concurrently executing one or more transactions in the distributed database system 110. Furthermore, the query servers 112 do not need to communicate with each other in order to coordinate concurrent execution of transactions in the distributed database. In maintaining the ACID properties during execution of a transaction in a distributed database, the execution query server executes the one or more statements that represent instructions of the transaction by communicating with one or more of the index servers 114 and one or more of the data servers 116. In particular, the execution query server executes the one or more statements of a received transactions by generating or accessing local copies of records (e.g., documents in a document-oriented database or rows in a relational database) corresponding to the one or more statements. The execution query server further locally performs modifications corresponding to the one or more statements on the local copies of the records. After locally executing the one or more statements, the execution query server commits the local copies to the data servers 116. For example, the execution query server may begin committing the local copies to the data servers 116 based on reaching a "COMMIT" statement of the transaction. As described above with reference to the distributed database system 110, a query server 112 may be a virtual database node executed on one or more computing devices (e.g., a server computer or server cluster), where each of the one or more computing devices can include one or more virtual database nodes. Execution of ACID transactions by an execution query server is described in greater detail below with reference to FIGS. 2-3.

In some embodiments, the execution query server caches local copies records as the statements of a transaction are executed. In this case, the execution query server can use cached records to execute a statement if records relevant to the statement were cached during execution of a previous statement. In doing so, the execution query server improves transaction execution efficiency by quickly accessing cached records, rather than repeatedly performing the relatively expensive operation of retrieving the records from the data servers 116.

In some embodiments, the execution query server generates a query execution plan (QEPs) for one or more statements (e.g., DML statements) of a received transaction in order to execute the transaction. A QEP for a statement can be represented by an ordered sequence of operators, where each operator describes instructions for a specific operation on one or more indexes (e.g., stored on one or more index servers 114) or records (e.g., stored on one or more data servers 116). Example operations performed by QEP operators include SQL fetch, index scan, key scan, union scan, intersect scan, nested or fetch loop joins, hash joins, and any other operation usable to execute a transaction statement. In particular, the query servers 112 can generate QEPs including operators configured to fetch indexes or data from an index server 114 or data server 116, respectively, or to use cached data retrieved for a previous statement, depending on whether the relevant data has been cached or not. Generating QEPs for query statements which fetch data or use cached data to execute transactions is described in greater detail below with reference to the transaction execution module 210 and FIG. 2.

In some embodiments, the query servers 112 determine an optimal QEP from a set of possible (i.e., logically equivalent) QEPs for a given query statement using a set of optimization criteria. In one embodiment, the optimization criteria include a set of rules for generating QEPs, such as an order in which query filters are applied to fields, which logical operators to use, and any other applicable rules used to optimize query execution. In the same or different embodiment, the optimization criteria may identify an optimal QEP based on execution costs determined for individual QEPs in the set of possible QEPs. For example, QEPs may be costed, and an optimal QEP may be selected, using any of the methods described in co-pending U.S. patent application Ser. No. 16/788,923, filed Feb. 12, 2020, which is incorporated herein by reference in its entirety.

The index servers 114 manage indexes for data stored in the distributed database system 110. In various embodiments, the index servers 114 can receive requests for indexes (e.g., during execution of a transaction) from the query servers 112 (e.g., from an execution query server), directly from the client device 120, or some other element of the system environment 100. The index servers 114 can generate indexes for one or more fields of records stored by the data servers 116. Indexes stores by the index servers can include B-tree indexes, inverted tree indexes, hash indexes, R-tree indexes, GIST indexes, or any other suitable type of database index. The index servers 114 may automatically generate or update indexes for one or more records stored in the data server 116 based on transactions performed by the to the distributed database system 110. Additionally, or alternatively, the index servers 114 may automatically generate or update indexes for one or more records stored in the data server 116 based on a request (e.g., an instruction associated transaction) received from another component of the distributed database system 110 (e.g., the query servers 112). In some embodiments, a given index server of the index servers 114 manages indexes stored on a corresponding index storage server or server cluster. In the same or different embodiments, a given index server of the data servers 116 manages indexes stored locally on the given data server. As described above with reference to the distributed database system 110, an index server 114 may be a virtual database node executed on one or more computing devices (e.g., a server computer or server cluster), where each of the one or more computing devices can include one or more virtual database nodes.

The data servers 116 manage data (e.g., records) stored in a distributed database of the distributed database system 110. In various embodiments, the data servers 116 can provide requested data to other elements of the system environment 100 (e.g., the query servers 112) and store new or modified data in the distributed database. In particular, the data servers 116 can perform commits of new or modified data to the distributed database which maintain the ACID properties of transactions. The distributed database may be one of various types of distributed databases, such as a document-oriented database, a key-value store, a graph database, a relational database, a wide-column database, or a search index. In some embodiments, a given data server of the data servers 116 manages data stored on a corresponding data storage server or server cluster. In the same or different embodiments, given data server of the data servers 116 manages data stored locally on the given data server. As described above with reference to the distributed database system 110, a data server 116 may be a virtual database node executed on one or more computing devices (e.g., a server computer or server cluster), where each of the one or more computing devices can include one or more virtual database nodes.

In an exemplary embodiment, in order to maintain the ACID properties in committing a transaction, the data servers 116 maintain Active Transaction Records (ATRs) which describe the status of transactions actively being executed by one or more query servers 112. The ATRs are accessible to the query servers 112 in order to provide awareness to the query servers 112 of other transactions being executed and prevent transaction conflicts from occurring. Furthermore, the data servers 116 maintain data associated with individual records usable to stage modifications of the records (i.e., virtual attributes). Similarly, to the ATRs, the virtual attributes of each record are accessible to the query servers 112 in order to provide awareness of whether a record is being modified by another active transaction. Staged modifications in the virtual attributes of a record can include an identifier of a transaction corresponding to the modification, such as an identifier of an entry for the transaction in an ATR. Furthermore, the virtual attributes can include information allowing a first query server 112 to determine whether a record has been modified by a second query server 112 during execution of a transaction locally at the query server 112. In particular, the virtual attributes can include a check-and-set (CAS) value which is received by a query server 112 when reading the virtual attributes of a record. The CAS value for the virtual attributes for a record can be updated each time the virtual attributes are modified. As such, a query server 112 can prevent write-write transaction conflicts by determining whether a CAS value for the virtual attributes of a record changes between the time the CAS is first received and the query server 112 attempts to modify the virtual attributes (e.g., to stage new modifications). This exemplary embodiment and its various processes are described in further detail by co-pending U.S. Provisional Application No. 63/029,325, which is incorporated by reference herein in its entirety. Furthermore, performing commits of new or modified data to the distributed data servers 116 which maintain the ACID properties of transactions, and particularly using ATRs and virtual attributes, is described in greater detail below with reference to FIGS. 2 and 3.

The client device 120 provides transactions to the distributed database system 110. In particular, the client device 120 sends single or multi-statement transactions to the distributed database system 110. The transactions can include statements represented using a declarative programming language, procedural query language, or other type of query language used by the distributed database system 110. In embodiments, the client device 120 sends transactions to the distributed database system 110 over the network 130. The transactions may be generated via the client application 125 or other process executing on the client device 120. Furthermore, the client device 120 can receive data from the distributed database system 110, such as data requested in a transaction. In some embodiments, the client device 120 provides transactions to the distributed database system 110 through one or more transaction coordination servers, which then route the transactions to an executing query server of the query servers 112. In the same or different embodiments, the client device 120 provides transactions directly to an execution server of the query servers 112. In still another same or different embodiment, the client device 120 executes transactions locally by communicating directly with the index servers 114 or data servers 116. Example client devices include personal computers (PCs), mobile phones, additional server computers, etc. The client device 120 may communicate with the distributed database system 110 through an Application Programming Interface (API). An example API the distributed database system 110 might provide is a Representation State Transfer (REST) API.

In some embodiments, the client application 125 communicates with the distributed database system 110 via software integrated with a software development kit (SDK) associated with the distributed database system 110. In this case, the client application 125 may submit transactions using software tools provided by the SDK, such as transaction execution functions, stored procedures (e.g., PL/SQL), or eventing functions (e.g., Couchbase Eventing Functions). In this case, the client application 125 may submit transactions to the distributed database system using software tools of the SDK. The SDK may be implemented using any programming language (e.g., Java, C++, Python, etc.). The SDK may communicate with the distributed database system 110 via an Application Programming Interface (API) associated with the distributed database system 110 (e.g., using Representational State Transfer (REST) over an application protocol (e.g., HTTP)).

The interactions between the client device 120 and the distributed database system 110 are typically performed via a network 130, for example, via the Internet. In one embodiment, the network uses standard communications technologies or protocols. Example networking protocol include the transmission control protocol/Internet protocol (TCP/IP), the user datagram protocol (UDP), internet control message protocol (ICMP), etc. The data exchanged over the network can be represented using technologies and/or formats including JSON, the hypertext markup language (HTML), the extensible markup language (XNL), etc. In another embodiment, the entities can use custom or dedicated data communications technologies instead of, or in addition to, the ones described above. The techniques disclosed herein can be used with any type of communication technology, so long as the communication technology supports receiving a web request by the distributed database system 110 from a sender, for example, a client device 120 and transmitting of results obtained by processing the web request to the sender.

Figure 2:
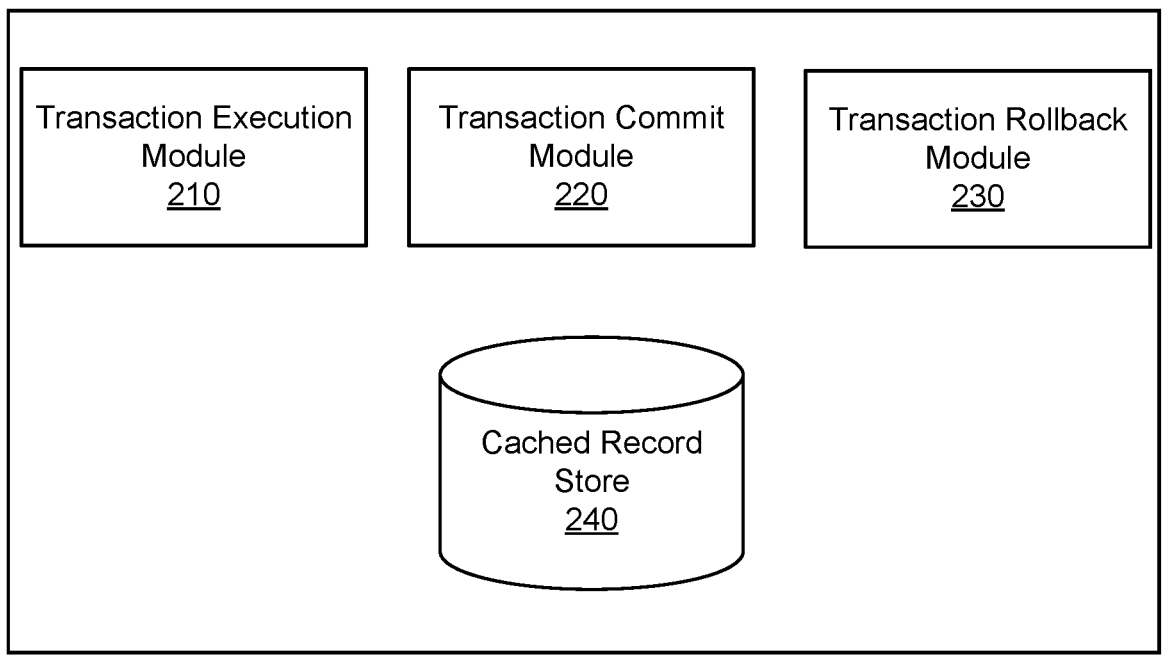
FIG. 2 is a block diagram of a query server, according to an embodiment.

FIG. 2 is a block diagram of an embodiment of a query server 200. The query server 200 may be an embodiment of one of the query servers 112. In the embodiment shown, the query server 200 includes a transaction execution module 210, a transaction commit module 220, a transaction rollback module 230, and a cached record store 240. In other embodiments, the query server 200 may include different or additional components than those shown in FIG. 2. Furthermore, some or all of the operations described for the query server 200 may be performed by other components of the distributed database system 110, or another suitable device.

The transaction execution module 210 executes transactions received by the query server 200 (i.e., when the query server 200 is used as an execution query server). In embodiments, the transaction execution module 210 executes each of one or more statements included in a received transaction. The received transaction can be a single statement transaction or a multi-statement transaction. If the received transaction is a multi-statement transaction, the statements of the transaction can describe modifications to multiple distinct groups of records stored in the data servers 116 (e.g., relational tables or document collections). The transaction execution module 210 can receive individual statements of a single transaction together or individually. In one embodiment, the client application 125 or distributed database management system 110 assign a transaction identifier to each statement associated with the same transaction provided by the client application 125. In doing so, the distributed database management system 110 can provide each statement with the same transaction identifier to the transaction execution module 210 of the same query server 200 to execute the transaction. As part of executing a statement, the transaction execution module 210 can communicate with one or more index servers 114 (e.g., in order to retrieve index keys for data relevant to a given statement of the transaction) and with one or more data servers 116 (e.g., in order to retrieve data relevant to a given statement of the transaction). For instance, if a statement identifies data stored by one or more of the data servers 116, the transaction execution module 210 may retrieve indexes corresponding to the data (e.g., based on a filter included in the statement) and use the retrieved indexes to retrieve the data from the one or more data servers 116. Furthermore, the transaction execution module 210 can locally cache the data in the cached record store 240 and if the cached data is identified by a subsequently executed statement the transaction execution module 210 can retrieve the cached data instead of communication with a data server 116. After retrieving data identified by a statement, the transaction execution module 210 performs any modifications to the data corresponding to the statement (e.g., INSERT, UPDATE, MERGE, DELETE) and stores a local copy of the modified data. In one embodiment, the transaction execution module 210 executes the statements of a received transaction serially in order to account for modifications corresponding to previously executed statements in subsequently executed statements. In doing so, the transaction execution module 210 accounts for the cumulative modifications corresponding to multiple statements of the received transaction. The transaction execution module 210 can provide the local copies of modified data corresponding to a transaction being executed to the transaction commit module 220 in order to commit the modifications to the data servers 116, as described below. Embodiments of execution of a transaction by the transaction execution module 210 is described in greater detail below with reference to FIGS. 3 and 4A-B.

In some embodiments, the transaction execution module 210 maintains a set of data structures to locally store (i.e., cache) indexes or data describing the execution of a transaction. In particular, the transaction execution module 210 can store the local copies of modified data for a transaction in one or more delta tables (e.g., in the cached data store 240). In one embodiment, the transaction execution module 210 maintains one or more delta tables for each transaction executed by the query server 200. If a transaction describes modifications to multiple groups of records (e.g., document collections), the transaction execution module 210 can maintain a distinct delta table for each group of records corresponding to the transaction. In this case, each delta table includes local copies of modified records from the corresponding group of records. In the same or different embodiments, the transaction execution module 210 can maintain transaction logs for some or all of the statements describing the modification performed for the corresponding statement. The transaction logs can be used by the transaction rollback module 230 to partially rollback modifications performed for statements of transactions, as described in greater detail below with reference to the transaction rollback module 230. In various embodiments, the local data structures corresponding to a transaction being executed by the transaction execution module 210 are private such that they are inaccessible to other processes on the transaction execution module 210 executing other transactions. Delta tables and transaction logs are described in further detail below with reference to FIGS. 3 and 4B. In some embodiments, the transaction execution module 210 maintains additional delta table or transaction logs for a transaction corresponding to previously executed statements of the transaction, which can be used to roll-back the modifications of a transaction in current delta table or transaction logs to the previous modifications (i.e., "save points"). Additionally, or alternatively, the transaction execution module 210 can maintain data structures for each statement of a transaction describing the data prior to any manipulations performed for the statement. The transaction execution module 210 can further maintain additional or different local data structures than those described above to describe the execution of a transaction.

In some embodiments, the transaction execution module 210 uses cached modified records to apply filter logic included in some statements of a received transaction. For example, if a received transaction includes a SELECT statement (e.g., SELECT a FROM x WHERE a<10) coming after one or more statements modifying the records corresponding to the SELECT statement, the transaction execution module 210 may apply the filter logic to the cached modified records to generate a projection table for the SELECT statement. In particular, if the transaction execution module 210 stores the modified records in one or more delta tables, the transaction execution module 210 can apply the filter logic to the one or more delta tables to generate the projection table. For instance, the transaction execution module 210 can efficiently combine the local copies of records in delta tables for previously executed statements and records retrieved from one or more data servers 116 to select records to modify for a current statement. This technique ensures correctness of modifications while improving performance and avoiding intermediate writes, index updates, and coordinating statement execution. Projection tables are described in greater detail below with reference to FIG. 4B.

During the process of executing a transaction by the transaction execution module 210, various issues can arise preventing processing of the transaction by the query server 200 at the current time. For instance, in various embodiments, a received transaction may not be executable by the transaction execution module 210, such as a transaction including malformed statements (e.g., invalid syntax of a query language used to represent the statements) or statements of a type not permitted by the transaction execution module 210 (e.g., DDLs). In this case, the transaction execution module 210 can validate the statements of a received transaction before beginning execution of the transaction. If an issue is identified in the transaction, the transaction execution module 210 can terminate processing of the transaction, and may further notify a client device 120 which submitted the transaction that the transaction was not executed. As another example, a technical error may occur during execution of the transaction preventing further execution of the transaction, such as the query server 200 crashing or experiencing some other error. In this case, the transaction execution module 210 aborts the transaction and provides the transaction to the transaction rollback module 230 to roll back the transaction. Transaction rollbacks are described in greater detail below with reference to the transaction rollback module 230 and FIG. 3. In some embodiments, the transaction execution module 210 does not abort a transaction if a failure occurs during retrieval of indexes from one or more index servers 114 in executing a statement of a received execution. In this case, the transaction execution module 210 may automatically retry retrieving the indexes, either immediately or after a time period has elapsed.

In some embodiments, the transaction execution module 210 executes some statements of a transaction by generating a QEP for the individual statements, as described above with reference to the query server 112 and FIG. 1. A QEP can include QEP operators describing an operation on data stored on one or more data servers 116, respectively, or cached on the query server 200. The transaction execution module 210 may generate different QEPs in order to account for different statement execution scenarios depending on whether relevant data are cached on the query sever 200. In particular, the transaction execution module 210 can generate a QEP for a statement that uses operators (e.g., scan or join operators) which retrieve data from the data servers 116, access local copies of data stored on the query server 200 (e.g., in a delta table corresponding to the transaction), or perform any combination thereof.

In some embodiments, a component of the distributed database system 110 executes a background process to update indexes stored on the index servers 114 to be consistent with updates to data stored on the data servers 116 (e.g., based on modifications to data resulting from an executed transaction). In this case, at the point in time the transaction execution module 210 is executing a statement of a received transaction the indexes used to execute the statement may not be consistent with modifications to data corresponding to transactions previously executed by the query server 200. In order prevent conflicts or other issues resulting from index inconsistency, the transaction execution module 210 can wait to retrieve indexes for a statement of a received transaction currently being executed until it determines that the indexes have been updated to be consistent with a previously execute transaction. For example, indexes stored in the index servers 114 may be associated with one or more values indicating the most recent transaction or other operation performed on the indexes (e.g., a sequence or version number). In this case, the transaction execution module 210 can check the one or more values to determine whether the indexes are consistent with modifications corresponding to previously executed transaction. As a result of waiting until indexes are consistent, the transaction execution module 210 can ensure a "read-your-writes" consistency level across two or more transactions executed serially.

In some embodiments, the transaction execution module 210 considers and implements integrity constraints for the distributed database system 110. In particular, the integrity constraints for the distributed database system place restrictions on data stored in the data servers 116. For instance, the distributed database system 110 may implement various SQL integrity constraints such as domain constraints, key constraints, referential integrity constraints, and entity integrity constraints. The transaction execution module 210 considers existing integrity constraints during execution of transactions, such as determining whether modifications corresponding to a transaction conform to existing integrity constraints. The transaction execution module 210 further implements new constraints for the distributed database system 110, such as constraints specified by a received transaction.

In the same or different embodiments, the transaction execution module 210 considers and implements database triggers for the distributed database system 110. In particular, the database triggers for the distributed database system enforces restrictions on manipulations of transactions executed by the transaction execution module 210 in response to certain transaction events (i.e., triggers). Similar to the integrity constraints described above, the transaction execution module 210 considers existing database triggers during execution of transactions. The transaction execution module 210 further implements new database triggers the distributed database system 110, such as database triggers specified by a received transaction.

The transaction commit module 220 commits local copies of modified data corresponding to a transaction executed by the transaction execution module 210 to one or more of the data servers 116. In embodiments, the transaction commit module 220 individually commits local copies of modifications for each record included in the modified data (i.e., record modifications). In particular, the commit process is divided into two stages: a pending stage during which the record modifications are staged in one or more data servers 116 storing the relevant records, and a committed stage during which the records are updated to persistently reflect the staged modification. The pending stage and the committed stage are configured to maintain the ACID properties of transactions during the commit process for record modifications in a distributed database. The transaction commit module 220 can further communicate with the transaction rollback module 230 in order to rollback a transaction in the pending stage in response to a failure or a conflict with another pending transaction being executed by the query server 200, a different query server 112, or a client device 120 communicating directly with one or more data servers 116. Transaction rollbacks are described in greater detail below with reference to the transaction rollback module 230 and FIG. 3. After the record modifications for a transaction are fully committed to one or more corresponding data servers 116, the transaction commit module 220 can communicate with the transaction execution module 210 or directly with the client device 120 which submitted the transaction to indicate the transaction was committed or provide data requested in the transaction.

In an exemplary embodiment, during the commit process by the transaction commit module 220 a transaction entry is added to an ATR corresponding to one or more records corresponding to a transaction. As described above with reference to FIG. 1, the transaction entry in the ATR provides visibility of the status of the transaction to other query servers 112 executing transactions or a client device 120 submitting transactions to the distributed database system 110. In one embodiment, the transaction commit module 220 manually selects an ATR for the transaction and adds the transaction entry to the transaction. In an alternative embodiment, the transaction entry is automatically added to the ATR by a data server 116, such as based on a first request to stage record modifications by the transaction commit module 220. Initially, the transaction entry for the transaction indicates that the transaction is pending and has not yet been committed (e.g., the transaction entry includes a field "transaction status". "pending").

During the pending stage, the transaction commit module 220 stages each of the record modifications for each record in the virtual attributes corresponding to the record. While in the pending stage, the transaction can be aborted for various reasons, such as encountering conflicting changes corresponding to a different pending transaction in the virtual attributes of a record (e.g., identifying a mismatching CAS value or identifying staged modifications in virtual attributes for another transaction), or a data server 116 crashing. If the transaction is aborted during the pending stage, the transaction commit module 220 updates the transaction entry in the ATR to indicate that the transaction has been aborted (e.g., the transaction status field is updated to "transaction status": "aborted"). Furthermore, the transaction commit module 220 communicates with the transaction rollback module 230 to rollback the aborted transaction. If the transaction commit module 220 successfully stages each of the record modifications, the transaction commit module 220 enters a committed stage and fully commits the transaction. In particular, the transaction commit module 220 persistently updates each record to reflect the staged record modifications. Before fully committing the transaction, the transaction commit module 220 updates the transaction entry in the ATR to indicate that the transaction is committed (e.g., the transaction status field is updated to "transaction status": "committed").

During the committed stage, the transaction commit module 220 considers the transaction to have been committed and the query server 200 does not roll back the transaction. To address failed transactions which have entered the committed stage, the distributed database system 110 maintains a cleanup process which completes the commit process for transactions which failed while being fully committed. In particular, the transaction commit module 220 may participate in the cleanup process by periodically querying ATRs stored by the data servers 116 and, if a failed transaction is identified, finish the process of committing the transaction. After successfully fully committing the modified records for a transaction, the transaction commit module 220 updates the transaction entry in the ATR to indicate that the transaction has successfully been fully committed (e.g., the transaction status field is updated to "transaction status": "completed").

The transaction rollback module 230 rolls back aborted transactions partially executed by the query server 200. In embodiments, the transaction rollback module 230 rolls back transactions which have been aborted prior to reaching the committed stage of the commit process executed by the transaction commit module 220, as described above. If a transaction is aborted or fails prior to the committed stage of the commit process, the transaction rollback module 230 frees up local memory resources used to execute the transaction locally (e.g., delta tables, transaction logs, or other data structures generated to execute a transaction at the query server). In some embodiments, the transaction rollback module 230 adds the transaction to an aborted transaction queue maintained by the distributed database system 110. In this case, the transaction execution module 210 of the query server 200 or another query server 112 attempts to execute the transaction again at some time after the transaction is added to the aborted transaction queue. For example, the transaction execution module 210 may execute one or more transactions in the aborted transaction queue on a periodic basis, or in response to an event, such as a request to retry the transaction from a client device 120.

In embodiments, the transaction rollback module 230 rolls back transactions aborted during local execution of the transactions at the transaction execution module 210 (e.g., prior to the commit process), as described above with reference to the transaction execution module 210. In this case, the transaction rollback module 230 removes local data at the query server 200 used to execute the transaction prior to the transaction being aborted (i.e., a local rollback). In the same or different embodiments, the transaction execution module 210 can abort execution of a statement of a transaction without aborting the entire transaction (i.e., a partial abort). In this case, the transaction rollback module 230 can use the transaction logs for the aborted statements to undo modifications corresponding to the individual statement. Example scenarios in which the transaction rollback module 230 may perform a rollback of a transaction during local execution include the client device 120 requesting a partial rollback of the transaction to a save point, the client device 120 requesting a rollback of the entire transaction, or automatically performing a partial or full rollback due to invalid transaction statements.

In the same or different embodiments, the transaction rollback module 230 can roll back transactions which are aborted or otherwise fail during the pending stage of the commit process at the transaction commit module 220 (i.e., a local rollback). For example, the transaction commit module 220 may determine that another transaction in the pending or committed stage conflicts with the transaction being committed by the transaction commit module 220. As another example, one or more of the data servers 116 may crash during the pending stage of the commit process. In these cases, the transaction rollback module 230 can communicate with the one or more data server 116 in order to rollback data modifications staged in the data servers 116 (i.e., a remote rollback). The transaction rollback module 230 can further perform a local rollback before, after, or concurrently to performing of a remote rollback.

In some embodiments, the transaction commit module 220 cannot reliably determine the state of a transaction in the process of being committed (i.e., the transaction is in an ambiguous state). For example, an ATR may include an entry for the transaction indicating that the transaction is still in the pending stage when some or all of the records corresponding to the transaction have been updated to reflect the staged record modifications, suggesting the transaction is in the committed stage. As another example, the transaction commit module 220 may not be able to determine the status of a transaction in a timely manner (e.g., an attempt by the transaction commit module 220 to read the ATR timed out). In such cases, the transaction commit module 220 can notify a client device 120 that submitted the transaction (e.g., via the client application 125) that the transaction is in an ambiguous state and can further provide information describing the ambiguous state to the client device 120. The client device 120 can then submit further transactions or other instructions in order to resolve the ambiguous state of the transaction. Additionally, or alternatively, the transaction commit module 220 can perform additional processing steps in response to encountering a transaction in an ambiguous state, such as retrying execution of the transaction or proceeding to use a record associated with an ambiguous transaction despite the ambiguous state.

Figure 3:
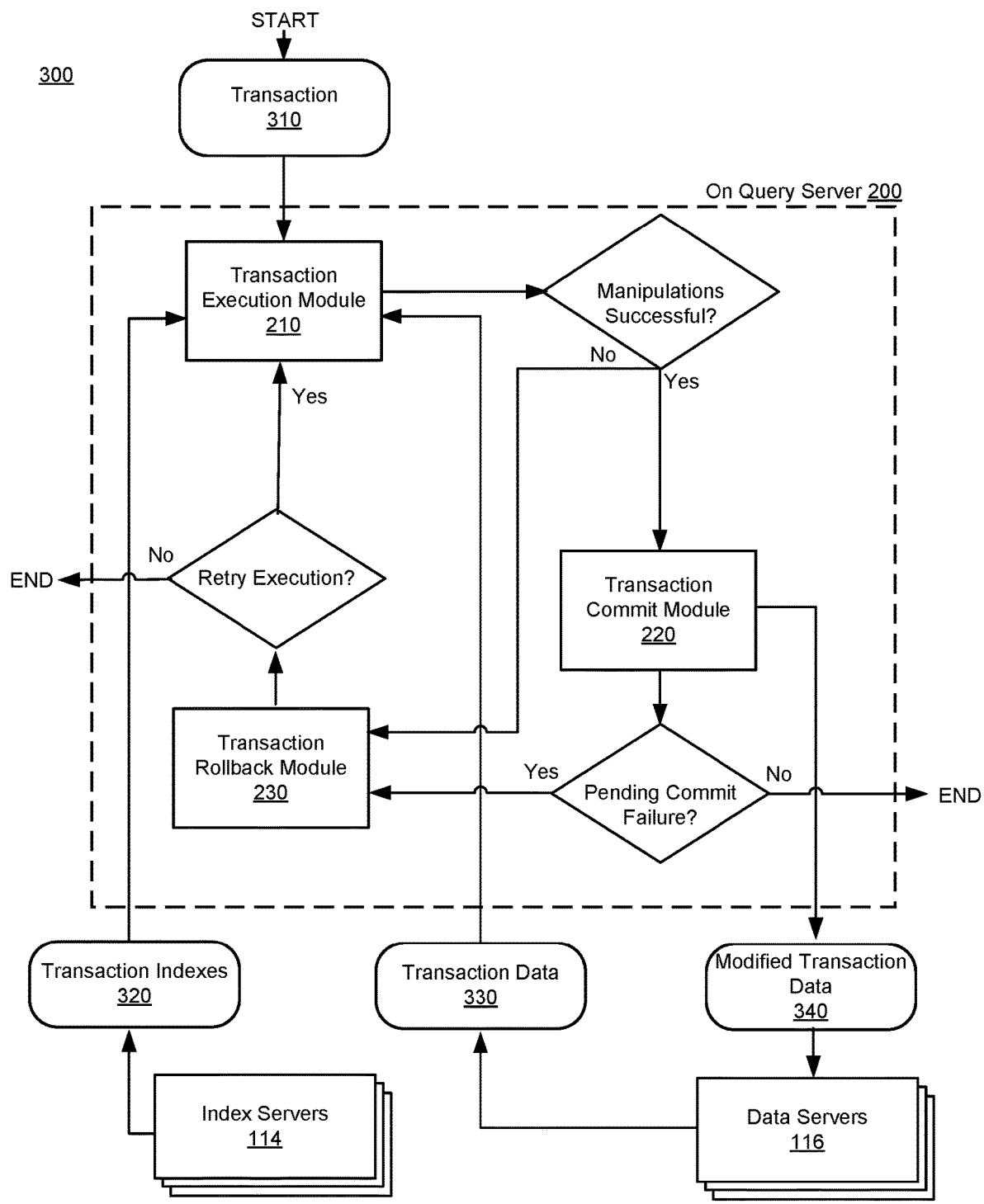
FIG. 3 is a flow diagram illustrating an execution of a distributed transaction by a query server, according to an embodiment.
Figure 4A:
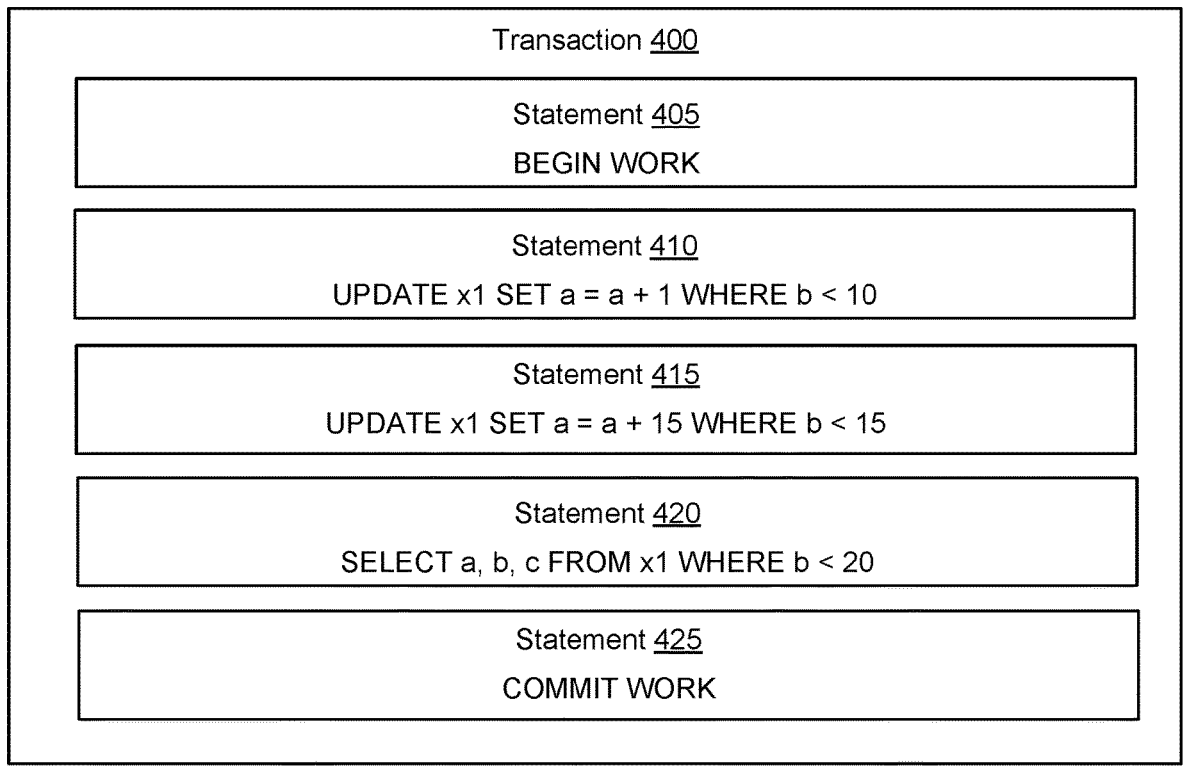
FIG. 4A illustrates a transaction 400 represented using a declarative query language, according to an embodiment.

FIG. 3 is a flow diagram illustrating an embodiment of an execution 300 of a distributed transaction 310 by the query server 200. In the embodiment shown, the query server 200 receives the transaction 310 at the transaction execution module 210. The transaction 310 may be a multi-statement transaction or a single statement transaction. In particular, the transaction 310 can be a single statement transaction describing a large volume of data (e.g. thousands or millions of records). If the transaction 310 is a single statement transaction represented using SQL syntax it may be an UPDATE or DELETE statement of multiple records, a MERGE INTO statement, an INSERT INTO statement, or a SELECT FROM statement. Additionally, the transaction 310 can be a multi-statement transaction (e.g., as depicted in FIG. 4A) including multiple DML statements. The statements of the transaction 310 may further describe records corresponding to different groups of records (e.g., relational tables or document collections). The transaction execution module 210 executes each of the one or more statements of the transaction 310 locally, and depending on the embodiment can execute some or all of the statement of the transaction 310 concurrently and in various orders.

During execution 300 of the transaction 310, the transaction execution module 210 retrieves transaction indexes 320 from one or more index servers 114. The transaction indexes 320 include a set of distinct indexes which together can be used to execute the one or more statements of the transaction 310. As such, the transaction execution module 210 can retrieve various indexes within the transaction indexes 320 corresponding to different statements of the transaction 310 during different or concurrent time intervals. The particular transaction indexes 320 used to execute the transaction 310 may depend on a set of one or more QEPs generated by the transaction execution module 210 to execute the statements of the transaction 310. Furthermore, some statements of the transaction 310 can be executed without the transaction indexes 320, such as statements including one or more identifiers of one or more records stored in the data servers 116, allowing the transaction execution module 210 to access the one or more records directly.

Using at least in part the transaction indexes 320, the transaction execution module 210 retrieves transaction data 330 from one or more data servers 116. The transaction data 330 includes data corresponding to the statements of the transaction 310 (e.g., data modified or requested by the transaction 310). As such, the transaction execution module 210 can retrieve various subsets of data within the transaction data 330 corresponding to different statements of the transaction 310 during different or concurrent time intervals. The transaction execution module 210 caches the transaction data 360 on the query server 200 during execution of the one or more statements of the transaction 310 (e.g., in the cached record store 240). If cached data of the transaction data 330 corresponds to a statement of the transaction 310 executed subsequently to the caching (e.g., after the corresponding data was cached during execution of a previous statement), the transaction execution module 210 can use the cached data to execute the statement.

Using the retrieved transaction data 330, the transaction execution module 210 performs the modifications corresponding to the one or more statements of the transaction execution module 210 on the corresponding data and stores local copies of the modified data on the query server 200 (e.g., in the cached record store 240). The transaction execution module 210 may store the local copies of the modified data or other data describing the modifications using various data structures, such as one or more delta tables or transaction logs, as described above with reference to the transaction execution module 210 and FIG. 2.

If the transaction execution module 210 successfully executes the one or more statements of the transaction 310 and performs the corresponding modifications on the transaction data 330, the transaction execution module 210 provides the modified transaction data 340 to the transaction commit module 220. If the transaction execution module 210 does not successfully execute the one or more statements of the transaction 310, the transaction execution module 210 aborts execution of the transaction 310 and communicates with the transaction rollback module 230 to roll back the transaction 310. In this case, the transaction rollback module 230 may perform a local rollback to remove any data describing the execution of the transaction 310 prior to aborting the transaction (e.g., delta tables or transaction logs). If the transaction can be retried, the transaction rollback module 230 adds the transaction 310 to an aborted transaction queue maintained by the query server 200 and the query server 200 tries to execute the transaction 310 again at a later time. If the transaction cannot be retried, such as if the transaction is malformed, then the transaction execution process by the query server 200 ends.

After receiving the modified transaction data 340, the transaction commit module 220 then attempts to commit the modified transaction data 340 to one or more relevant data servers 116 (e.g., the data servers 116 storing the transaction data 330). If the transaction commit module 220 successfully commits the modified transaction data 340 to the one or more relevant data servers 116, the execution 300 end. If the transaction commit module 220 does not successfully commit the modified transaction data 340 to the relevant one or more relevant data servers 116 during the pending stage, the transaction commit module 220 aborts the execution 300 of the transaction 310 and communicates with the transaction rollback module 230 to perform at least a remote roll back of the transaction 310. In this case, the transaction rollback module 230 adds the transaction to an aborted transaction queue so that the transaction 310 can be retried at a later time. If the transaction commit module 220 does not successfully commit the modified transaction data 340 to the one or more relevant data servers 116 during the committed stage, the transaction commit module 220 of the query serve 200, or another query sever 112, finishes committing the modified transaction data 340 during a cleanup process at a later time.

FIG. 4A illustrates an embodiment of a transaction 400 represented using a declarative query language. In the embodiment shown, the transaction 400 is a multi-statement transaction including statements represented using a declarative query language with SQL syntax. In other embodiments, the statements of the transaction 400 are represented using declarative query languages with other syntax or other query languages (e.g., procedural query languages). In the example depicted in FIG. 4A, the transaction 400 includes five statements (i.e., statements 405, 410, 415, 420, and 425). In other examples, the transaction 400 can include different statements than those depicted in FIG. 4A, and furthermore can include additional or fewer statements.

As depicted in FIG. 4A, the statements 405 and 425 of the transaction 400 signify the start and the committing of the transaction, respectively. In embodiments, the transaction 400 is assigned a transaction identifier during execution of the BEGIN WORK statement 405. The statements 410, 415, and 420 are DML statements describing modifications of fields "a," "b," and "c" for a set of records "x1" (e.g., a collection of documents stored on one or more data servers 116). In particular, the statements 410 and 415 are UPDATE statements which describe modifications (in particular, additions) to a value for the field "a" of records within "x1" where a value for the field "b" is less than ten and fifteen, respectively. The statement 420 is a SELECT statement which describes retrieving values for the fields "a," "b", and "c" from records of "x1" where the value for the field "b" is less than twenty. Depending on the embodiment, some statements of the transaction 400 can be executed in various orders or concurrently (e.g., by the transaction execution module 210). For example, the additions corresponding to statement 410 and 415 can be performed in any order.

FIG. 4B illustrates an embodiment of internal data structures maintained by a query server 112 during execution of the transaction 400. In the embodiment shown, a query server (e.g., the query server 200) maintains a delta table including delta tables entries 430 and 440 and a transaction log including transaction log entries 435 and 445 for the UPDATE statements 410 and 415, respectively. The query server further maintains a projection table 450 and a transaction log entry 455 for the SELECT statement 450. Further still, the query maintains a commit table 460 including the data to be committed based on execution of the statements 410, 415, and 420. In other embodiments, the query server maintains other data structures during execution of the transaction 400.

The delta table entries 430 and 440 include local copies of the records modified by the UPDATE statements 410 and 415, respectively. The delta table entries 430 and 440 correspond to entries in a single delta table for the transaction 310, where the entry for each record is added as statements describing modifications to the record are executed. In particular, the delta table entries 430 includes local copies of the values for the fields "a," "b" and "c" of the records "k1," "k2," and "k3" (i.e., the records in "x1" where the value for the field "b" is less than ten) after the modification corresponding to the statement 410 is applied. Similarly, the delta table entries 440 includes local copies of the values for the fields "a," "b" and "c" of the records "k1," "k2," "k3," and "k12" (i.e., the records in "x1" where the value for the field "b" is less than fifteen) after the modification corresponding to the statement 410 is applied. As depicted, the delta table entries 430 and 440 indicate that the statement 410 was executed before the statement 415, as the local copies of the values in the delta table entries 440 reflect the cumulative modifications of the statements 410 and 415. In an alternative embodiment, the statement 415 is executed before the statement 410. The query server 112 may have retrieved the records "k1," "k2," and "k3" from one or more data servers 116 during execution of the statement 410. In this case, rather than re-retrieving the records, the query server 112 can use the local copies of the records "k1," "k2," and "k3" stored in the delta table entries 430 (or otherwise cached on the query server 112) to execute the statement 415. The delta table entries 430 and 440 additionally include CAS values for each of the records "k1," "k2," and "k3," which are eventually transferred to the commit table 460 and can be used to prevent conflicts during the commit process, as described above with reference to the data servers 116 and FIG. 1.

The transaction log entries 435, 445, and 455 are entries in a transaction log for the transaction 400 corresponding to the statements 410, 415, and 420, respectively. The transaction log entries 435, 445, and 455 describe the specific modifications performed on a value of a field for each record in a delta table entry of a respective statement. The transaction log entries 435, 445, and 455 can be used by the transaction rollback module 230 to rollback aborted transactions, as described above with reference to the transaction rollback module 230. In particular, the transaction log entry 435 includes the values for the records "k1," "k2," and "k3" before and after the modification corresponding to the statement 410 was applied. In the case of the transaction log entry 435, the values for the records before the modification of the statement 410 was applied are the values stored by the distributed database system 110 before the transaction 400 was executed. Similarly, the transaction log entry 445 includes the values for the records "k1," "k2," "k3," and "k12" before and after the modification corresponding to the statement 410 was applied. In the case of the transaction log 445, the values for the records "k1," "k2," and "k3" before the statement 415 was applied are values reflecting the modifications corresponding to the statement 410 which was executed prior to the statement 415. The transaction log entry 455 does not include any modifications of values for records in "x1" because the statement 420 does not describe any modifications. In the embodiment shown, the transaction log entry 455 is an empty data structure, while in other embodiments the query server 112 only creates transaction log data structures (e.g., allocate the requisite memory space) for statements describing modifications.

The projection table 450 includes local copies of the records selected by the SELECT statement 420. In particular, the projection table 450 includes local copies of the values of the fields "a," "b" and "c" of the records "k1," "k2," "k3," "k5," and "k12" (i.e., the records in "x1" where the value for the field "b" is less than twenty). In creating the projection table 450, rather than re-retrieving the records "k1," "k2," "k3," and "k12", the query server 112 can use the local copies of the records "k1," "k2," "k3," and "k12" stored in the delta tables 430 and 440 (or otherwise cached on the query server 112) to execute the statement 420. In particular, the query server 112 can apply the filter logic of statement 420 (i.e., WHERE b<20) to the delta table entries 440 in order to generate the projection table 450.

The commit table 460 includes local copies of the records to be committed by the query server 112. In particular, the commit table 460 includes local copies of the modified values of the fields "a," "b" and "c" of the records "k1," "k2," "k3," and "k12" (i.e., the records modified by the transaction 400). The commit table 460 can be used to commit the modified records to one or more data servers 116, such as using the commit process described above in reference to the transaction commit module 220. The commit table 460 additionally includes the CAS values for the modified records, which can be used to avoid transaction conflicts during the commit process of the local copies of records in the commit table 460, as described above with reference to the data servers 116 and FIG. 1.

Figure 5:
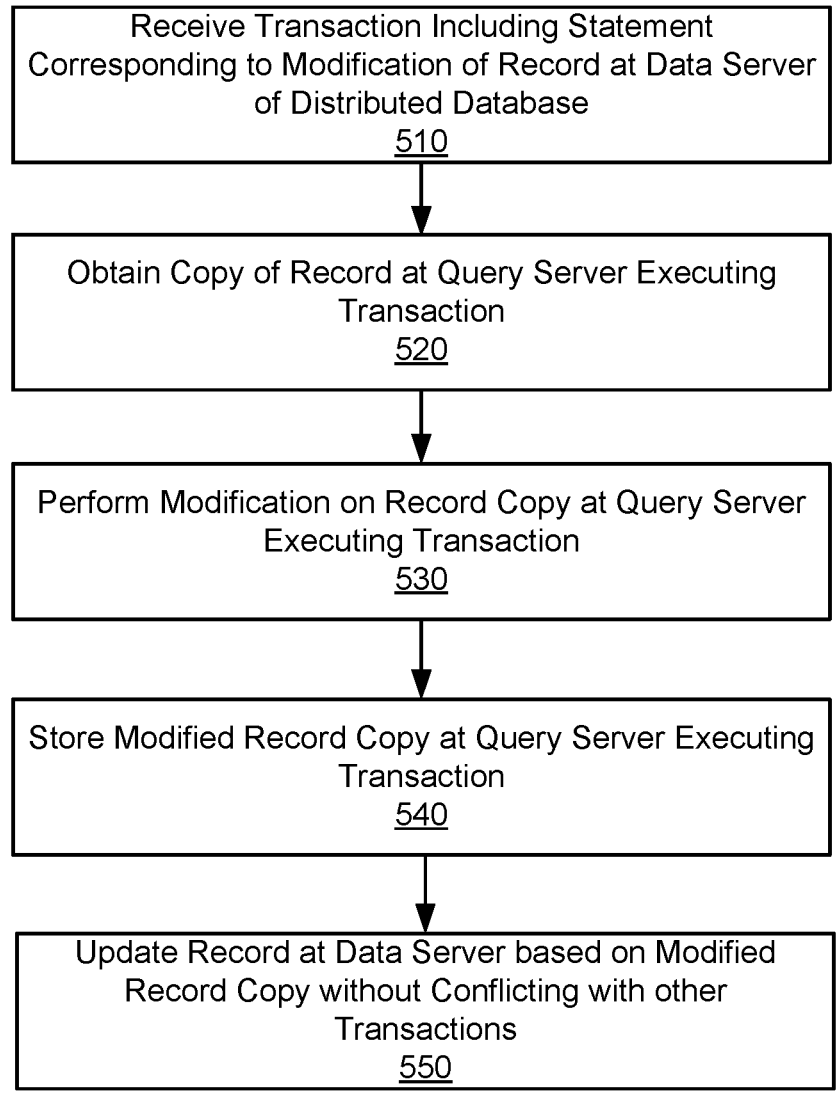
FIG. 5 is a flow chart illustrating a process for executing a transaction in a distributed database, according to an embodiment.

FIG. 5 is a flow chart illustrating an embodiment of a process 500 for executing a transaction in a distributed database. As described herein, the process 500 is performed by the distributed database system 110. In other embodiments, other entities may perform some or all of the steps in FIG. 5. Embodiments may also include different and/or additional steps or perform the steps in different orders.

In the embodiment shown in FIG. 5, the method 500 begins with the distributed database system 110 receiving 510 a transaction including a statement describing a modification of a record stored at a data server of a distributed database (e.g., a data server 116). For example, the distributed system 110 may receive a transaction from a client device 120 and select one of the query servers 112 to execute the transaction. The received transaction may be a single statement or multi-statement transaction, and the statement of the transaction be represented using a declarative query language or another type of query language. After receiving the transaction, the distributed database system 110 executes the transaction at s query server (e.g., a query server 112). During execution of the transaction at the query server, the distributed database system 110 obtains 520 a copy of the record at the query server. For example, the transaction execution module 210 may retrieve the record from a data server 116 and generate a local copy of the retrieved record. As another example, if the record has previously been retrieved during execution of another statement of the transaction and a local copy of the record is cached at the query server (e.g., in a delta table corresponding to the transaction), the transaction execution module 210 can retrieve the cached local copy of the record. Using the obtained record copy, the distributed database system 110 performs 530 the modification corresponding to the statement on the record copy at the query server. For example, the statement may describe an update to the value of a field of the record, and the transaction execution module 210 may modify the value of the field of the record copy to reflect the update. The distributed database system 110 stores 540 the modified record copy at the query server. For example, the transaction execution module 210 may store the modified record copy in a delta table. After executing transaction at the query server, the distributed database system 110 updates 550 the record stored at the data server based on the modified record copy. In particular, the distributed database system 110 updates the record without conflicting with any other transactions executed by the distributed database system 110 (e.g., transactions being executed concurrently by the distributed database system 110). For example, the transaction commit module 220 may update the record by performing a commit process for the transaction including a pending stage and a committed stage.

Computer Architecture

Figure 6:
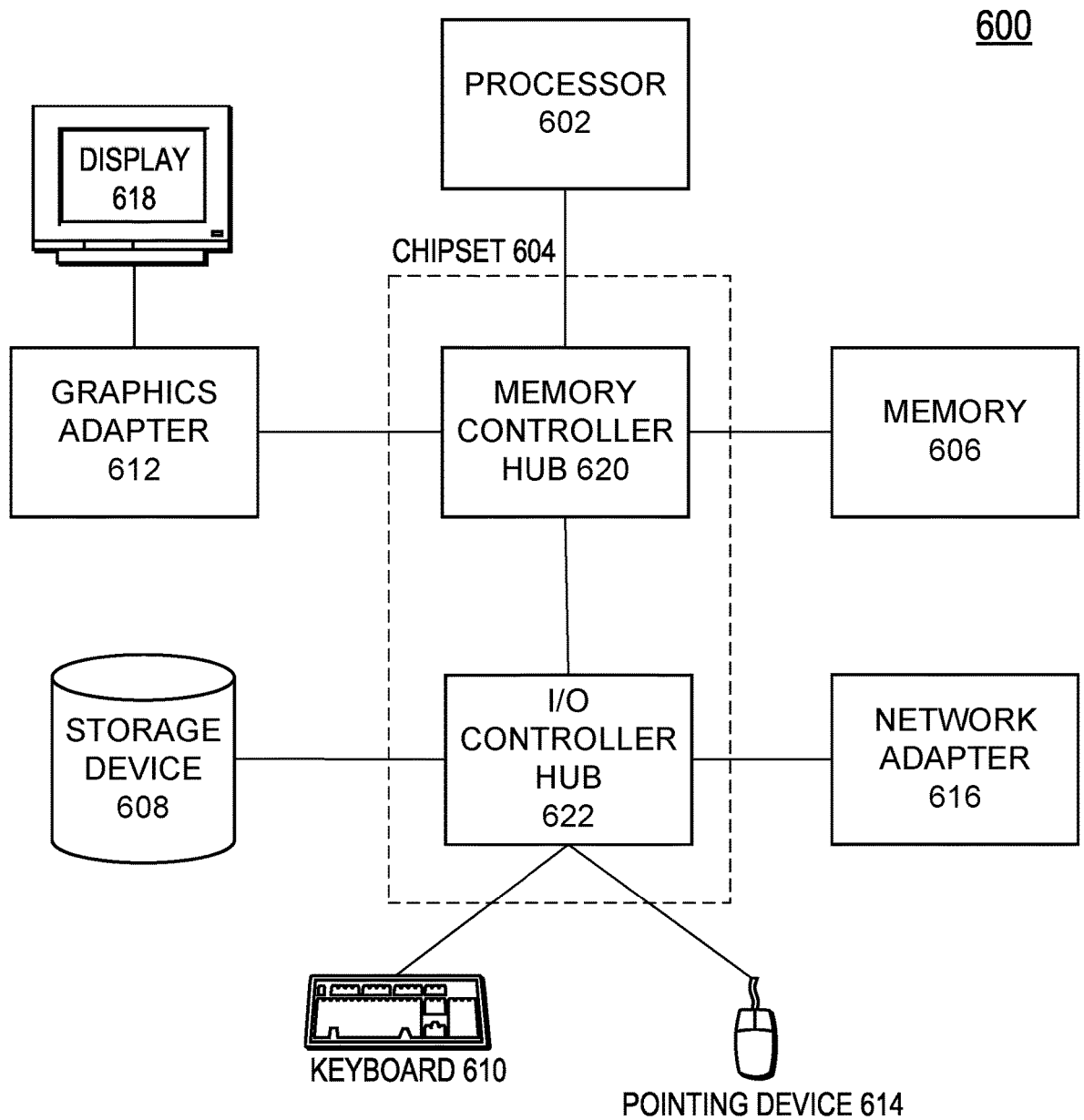
FIG. 6 is a high-level block diagram illustrating a functional view of a typical computer system for use as one of the entities illustrated in the system environment 100 of FIG. 1 according to an embodiment.

FIG. 6 is a high-level block diagram illustrating a functional view of a typical computer system for use as one of the entities illustrated in the system environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as a server (e.g., a query server 112) may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 606, and executed by the processor 602.

The types of computer systems 600 used by the entities of FIG. 1 can vary depending upon the embodiment and the processing power used by the entity. For example, a client device 120 may be a mobile phone with limited processing power, a small display 618, and may lack a pointing device 614. The entities of the distributed database system 110, in contrast, may comprise multiple blade servers working together to provide the functionality described herein.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

We claim:

1. A method for executing transactions in a distributed database, the method comprising:
receiving, by a distributed database system comprising a query server and a plurality of data servers, a transaction comprising a plurality of statements, the plurality of statements comprising (1) a first modification statement, describing a first modification operation on a subset of records stored in the plurality of data servers, (2) a second modification statement, describing a second modification operation on the subset of records, and (3) a commit statement, indicating commit of the first and second modification operations;
executing, at the query server, the transaction, the execution of the transaction comprising:
receiving a copy of the subset of records from at least one of the plurality of data servers; and
storing the copy of the subset of records at the query server;
responsive to executing the first modification statement,
performing the first modification operation on the subset of records stored locally at the query server to generate a first modified subset of records; and
storing first modifications of the subset of records in a first delta table at the query server including difference between the first modified subset of records and original subset of records; and
responsive to executing the second modification statement,
performing the second modification operation on the first modified subset of records stored in the first delta table to generate a second modified subset of records;
storing second modifications of the subset of records in a second delta table at the query server including difference between the second modified subset of records and the first modified subset of records;
responsive to executing the commit statement, storing the second modified subset of records in a commit table at the query server; and
responsive to completing execution of the transaction at the query server, causing the subset of records to be updated at the plurality of data servers based on the second modified subset of records in the commit table.

2. The method of claim 1, wherein the first delta table or the second delta table comprises one or more virtual attributes of the respective first or second modified subset of records.

3. The method of claim 2, wherein at least one of the one or more virtual attributes is a check-and-set value.

4. The method of claim 1, wherein the transaction is a multi-statement transaction including a plurality of statements, the plurality of statements including an additional statement including instructions for additional modification of the record, and wherein the execution of the transaction at the query server further comprises:
performing the additional modification of the record corresponding to the additional statement on the modified record copy stored at the query server;
storing the additionally modified record copy at the query server.

5. The method of claim 1, wherein receiving the transaction comprises: receiving, by the distributed database system, the statement at a first point in time, the statement associated with an identifier of the transaction; forwarding the statement to the query server based on the identifier; receiving, by the distributed database system, an additional statement at a second point in time after the first point in time, the additional statement also associated with the identifier of the transaction; and forwarding the additional statement to the query server based on the identifier.

6. The method of claim 4, wherein performing the additional modification of the record comprises:
storing the modified record copy in a delta table corresponding to the transaction;
retrieving the modified record copy from the delta table based on the additional statement;
performing additional modification of the record on the retrieved modified record copy; and
storing the additionally modified record copy in the delta table.

7. The method of claim 6, wherein executing the transaction further comprises:
generating a first query execution plan to execute the statement, the query execution plan including a first operator describing instructions to retrieve the record from the data server; and
generating a second query execution plan to execute the additional statement, the second query execution plan including a second operator describing instructions to retrieve the modified record copy stored at the query server.

8. The method of claim 6, wherein at least some of the plurality of statements are executed at the query server concurrently.

9. The method of claim 6, wherein executing the transaction further comprises:
storing a plurality of modified record copies in a delta table during execution of the plurality of statements at the query server;
generating one or more commit tables using the delta table, the one or more commit tables including the plurality of modified record copies after execution of each of the plurality of statements; and
updating, based on the commit table, a plurality of records corresponding to the plurality of modified record copies, the plurality of records stored by one or more data servers of the plurality of data servers.

10. The method of claim 6, wherein the plurality of statements describes one or more modifications of records corresponding to a plurality of record collections in the distributed database.

11. The method of claim 6, wherein at least some of the plurality of statements of the transaction are Data Manipulation Statements (DMLs).

12. The method of claim 1, wherein updating of the record at the data server comprises:

staging, by the query server, the modified record copy at the data server; and responsive to successfully determining the transaction does not conflict with any other transactions executed by the distributed database system, changing the record stored at the data server to the staged modified record copy.

13. The method of claim 1, wherein the query server executes a plurality of transactions concurrently without coordinating the execution of each transaction of the plurality of transactions.

14. The method of claim 1, wherein the statement is represented using a declarative query language.

15. The method of claim 1, further comprising:
receiving, by a distributed database system, a second transaction including one or more statements; and
responsive to execution of the second transaction failing at a second query server, removing a second modified record copy stored at the second query server during execution of the second transaction.

16. The method of claim 15, wherein the failing of the second transaction is based on a second statement of the second transaction, and further comprising:
replacing the second modified record copy with a third modified record copy corresponding to third statement executed at the second query server before the second statement.

17. The method of claim 1, further comprising:
receiving, by a distributed database system, a second transaction including one or more statements represented using a declarative query language, the one or more statements including instructions for a second modification of a second record stored at a second data server of a plurality of data servers of the distributed database;
storing a second modified record copy at a second query server during execution of the transaction at the second query server;
staging the second modified record copy at the second data server; and
responsive to an update of the second record failing, rolling back the failed update by the second query server, the rolling back including removing the staged second modified record copy from the second data server.

18. A distributed database system comprising:
a query server;
a distributed database including a plurality of data servers; and
a non-transitory computer readable storage medium for storing instructions that when executed by a computer processor cause the computer processor to perform steps for exacting a transaction in the distributed database, the steps comprising:
receiving, by a distributed database system comprising a query server and a plurality of data servers, a transaction comprising a plurality of statements, the plurality of statements comprising (1) a first modification statement, describing a first modification operation on a subset of records stored in the plurality of data servers, (2) a second modification statement, describing a second modification operation on the subset of records, and (3) a commit statement, indicating commit of the first and second modification operations;
executing, at the query server, the transaction, the execution of the transaction comprising:

receiving a copy of the subset of records from at least one of the plurality of data servers; and
storing the copy of the subset of records at the query server;
responsive to executing the first modification statement,
performing the first modification operation on the subset of records stored locally at the query server to generate a first modified subset of records; and
storing first modifications of the subset of records in a first delta table at the query server including difference between the first modified subset of records and original subset of records; and
responsive to executing the second modification statement,
performing the second modification operation on the first modified subset of records stored in the first delta table to generate a second modified subset of records;
storing second modifications of the subset of records in a second delta table at the query server including difference between the second modified subset of records and the first modified subset of records;
responsive to executing the commit statement, storing the second modified subset of records in a commit table at the query server; and
responsive to completing execution of the transaction at the query server, causing the subset of records to be updated at the plurality of data servers based on the second modified subset of records in the commit table.

19. The system of claim 18, wherein the first delta table or the second delta table comprises one or more virtual attributes of the respective first or second modified subset of records.

20. A non-transitory computer readable storage medium for storing instructions that when executed by a computer processor cause the computer processor to perform steps comprising:
receiving, by a distributed database system comprising a query server and a plurality of data servers, a transaction comprising a plurality of statements, the plurality of statements comprising (1) a first modification statement, describing a first modification operation on a subset of records stored in the plurality of data servers, (2) a second modification statement, describing a second modification operation on the subset of records, and (3) a commit statement, indicating commit of the first and second modification operations;
executing, at the query server, the transaction, the execution of the transaction comprising:
receiving a copy of the subset of records from at least one of the plurality of data servers; and
storing the copy of the subset of records at the query server;
responsive to executing the first modification statement,
performing the first modification operation on the subset of records stored locally at the query server to generate a first modified subset of records; and
storing first modifications of the subset of records in a first delta table at the query server including difference between the first modified subset of records and original subset of records; and
responsive to executing the second modification statement, performing the second modification operation on the first modified subset of records stored in the first delta table to generate a second modified subset of records;
storing second modifications of the subset of records in a second delta table at the query server including difference between the second modified subset of records and the first modified subset of records;
responsive to executing the commit statement, storing the second modified subset of records in a commit table at the query server; and
responsive to completing execution of the transaction at the query server, causing the subset of records to be updated at the plurality of data servers based on the second modified subset of records in the commit table.

* * * * *

UNITED STATES PATENT AND TRADEMARK OFFICE
CERTIFICATE OF CORRECTION

| | |
|---|---|
| PATENT NO. | : 12,007,985 B2 |
| APPLICATION NO. | : 18/144057 |
| DATED | : June 11, 2024 |
| INVENTOR(S) | : Murthy et al. |

It is certified that error appears in the above-identified patent and that said Letters Patent is hereby corrected as shown below:

In the Claims

In Column 23, in Claim 18, Line 54, delete "exacting" and insert -- executing --, therefor.

Signed and Sealed this
Fifth Day of November, 2024

Katherine Kelly Vidal
*Director of the United States Patent and Trademark Office*